US008092295B2

(12) United States Patent
Fujimoto

(10) Patent No.: US 8,092,295 B2
(45) Date of Patent: Jan. 10, 2012

(54) GAME SYSTEM, GAMING MACHINE USED IN SUCH GAME SYSTEM, AND GAMING METHOD

(75) Inventor: Jun Fujimoto, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1565 days.

(21) Appl. No.: 10/961,188

(22) Filed: Oct. 12, 2004

(65) Prior Publication Data

US 2005/0079910 A1 Apr. 14, 2005

(30) Foreign Application Priority Data

Oct. 14, 2003 (JP) ................................ 2003-353597

(51) Int. Cl.
*A63F 13/00* (2006.01)

(52) U.S. Cl. ............................... 463/20; 463/25; 463/29

(58) Field of Classification Search .................... 463/20, 463/25, 17, 29
See application file for complete search history.

(56) References Cited

U.S. PATENT DOCUMENTS

| | | | | | |
|---|---|---|---|---|---|
| 4,856,787 | A | * | 8/1989 | Itkis | 273/237 |
| 5,575,717 | A | * | 11/1996 | Houriet et al. | 463/1 |
| 5,618,232 | A | * | 4/1997 | Martin | 463/25 |
| 5,743,799 | A | * | 4/1998 | Houriet et al. | 463/25 |
| 6,896,618 | B2 | * | 5/2005 | Benoy et al. | 463/25 |
| 7,189,161 | B1 | * | 3/2007 | Wiltshire et al. | 463/42 |
| 7,510,474 | B2 | * | 3/2009 | Carter, Sr. | 463/29 |
| 2003/0069067 | A1 | * | 4/2003 | Okada | 463/20 |
| 2005/0059484 | A1 | * | 3/2005 | Logan et al. | 463/29 |
| 2008/0132314 | A1 | * | 6/2008 | Robb et al. | 463/17 |

FOREIGN PATENT DOCUMENTS

| | | | |
|---|---|---|---|
| DE | 196 23 299 | A1 | 1/1998 |
| DE | 197 11 096 | A1 | 9/1998 |
| EP | 1 168 781 | A1 | 1/2002 |
| EP | 1 173 037 | A2 | 1/2002 |
| EP | 1 223 768 | A1 | 7/2002 |
| JP | 08-110214 | | 4/1996 |
| JP | 2003-135855 | | 5/2003 |

* cited by examiner

*Primary Examiner* — Masud Ahmed
(74) *Attorney, Agent, or Firm* — Oliff & Berridge, PLC

(57) ABSTRACT

A game system 1 has a bookmaker terminal 20 for setting odds for various events, and a plurality of gaming machines 50 that receive, via communication means 10, odds information set by the terminal 20. Each of the gaming machines 50 has: a gaming device 55 for executing the gaming machine-original game; a game control section 70 for controlling the execution of the game played on the gaming machine 50, as well as for controlling acceptance/payout of a gaming medium; and a bookgame control section 70 for accepting a bet by the odds on the event, with respect to the received odds information. Accordingly, in a game arcade, even when a popular event is relayed, it is possible to provide a game system in which the attention of the player to the gaming machine is not decreased.

18 Claims, 5 Drawing Sheets

GAME SYSTEM, GAMING MACHINE USED IN SUCH GAME SYSTEM, AND GAMING METHOD

RELATED APPLICATIONS

This application claims the priority of Japanese Patent Application No. 2003-353597 filed on Oct. 14, 2003, which is incorporated herein by reference.

BACKGROUND OF THE INVENTION

1. Field of the Invention

The present invention relates to a game system in which a plurality of games can be played on a single gaming machine, a gaming machine used in such game system, and a game method.

2. Description of the Prior Art

Various types of gaming machines are installed in a game arcade such as, for example, a casino and game bar, where a guest selects a gaming machine according to his/her preference to play a game. The gaming machines installed in such a game arcade include many gaming machines where games with a short cycle (poker, slot machine or the like, which is generally called a "single game") are played, and where games with a long cycle (roulette, horse race game or the like, which is generally called a "mass game") are played.

In the abovementioned game arcade where various gaming machines are installed, a player sometimes feels bored while playing a mass game. In order to spend such a tedious time, there has been proposed a game system in which a single game can be played while a mass game is being played, as disclosed in Japanese Unexamined Patent Publication No. 2003-135855, for example. According to such a game system, by combining a game with a long cycle and a game with a short cycle, the time in which a game is actually played by a player can be increased, thereby preventing that the player feels bored.

Incidentally, in the game arcade as described above, when a publicly highly popular event (e.g., various sporting events such as football, baseball and basketball, political events such as a presidential election, etc.) is held, the event is usually relayed on a monitor. In such a case, the problem is that the player in the game arcade pays attention exclusively to the event and cannot enjoy the games enough. The game arcade, too, has a problem in that the rate of operation of the gaming machine is reduced.

SUMMARY OF THE INVENTION

The present invention has been proposed on the basis of the abovementioned situations, and has an object of providing a game system where the attention of a player to a gaming machine does not decrease even when a popular event is relayed in the game arcade, a gaming machine to be used for such game system, and a game method.

In order to achieve the object described above, the game system according to the present invention comprises: an odds setting terminal for setting odds for the various events which are the objects for prediction; and a plurality of gaming machines that receive, via communication means, information on the odds set by the terminal, wherein each of the gaming machines has: a gaming device for executing the gaming machine-original game; game control means for controlling the execution of the game played on the gaming device, as well as for controlling acceptance/payout of a gaming medium; and bookgame control means for accepting a bet by the odds on the event, with respect to the received odds information, the bookgame control means being capable of accepting the gaming medium to be paid out in the game of the gaming device.

In the gaming system with abovedescribed configuration, when a publicly highly popular event is held, and if it is the object for prediction, for instance, odds (possibility rates) that are set by a bookmaker are delivered as the odds information to the various gaming machines installed in the game arcade, such as a casino, bar or the like, via the communication means, such as an internet line or a dedicated line. The odds setting terminal described above can be constituted by a terminal that is managed by the bookmaker or the controlled company of the terminal that are connected to the communication means. The event information for wager, and the odds information determined for each of the events are sent to the numbers of gaming machines via the communication means.

On the other hand, the odds information on the event described above is presented to the player from the gaming machine on which a game is played, so the player can bet (purchase a bet ticket) on the event from that gaming machine. In other words, the player can view the odds information on the popular event on the gaming machine, and, even during the game, the player can directly purchase a bet ticket and can enjoy the game of the gaming machine, and, at the same time, can enjoy the game (bookgame) for the event.

Further in the above gaming system, it is possible that in the bookgame control means, the gaming medium accepted by the gaming device can be used when a bet is carried out.

In such a configuration, the player can bet on the game of the gaming machine as well as on the bookgame by means of the same gaming medium (coins, medals, etc.). Therefore, for example, the profit acquired in the gaming machine can be bet directly on the bookgame, so the player can enjoy each game. In addition, in such a configuration, a unit for executing the bookgame can be installed directly into the gaming machine and implemented.

In the game system, it is possible that the bookgame control means have bet result outputting means for outputting information on bet results for the event to the player when accepting a bet on said event.

In such a configuration, in the stage where the bet on that event is accepted, the bet result information is outputted to the player immediately, thus the player does not have to occupy the gaming machine until the event ends, whereby it is possible to improve the rotation rate of the game of the gaming machine. Note that the outputting of the bet result information may be performed by issuing a ticket in the form of a sheet by means of a ticketing device, or by delivering the bet result information to a mobile terminal (cellular phone or the like) owned by the player, via the communication means.

Further, in the gaming machine of the game system, a game can be played on the gaming device by using a paid out gaming medium when the bet wins in the bookgame.

In such a configuration, when the bet wins in the bookgame, the player can bet on the game of the gaming machine, with the payout obtained from the event as a start, upon the end of the event. Therefore, for example, in a game arcade exclusively for bookgames, the game of the gaming machine can be enjoyed between the events.

In addition, in order to achieve the objects described above, the gaming machine of the present invention has: a gaming device for executing a game; and game control means for controlling the execution of the game played in the gaming device, as well as for controlling acceptance/payout of a gaming medium. The gaming machine comprises: a communication control section for receiving odds information set for the various events that are the objects for prediction; bookgame control means for accepting a bet by the odds on an event, with respect to the received odds information; and an operating section for operating the game, as well as for operating the bet.

In the gaming machine described above, when a publicly highly popular event is held, and when the event is the object for prediction, odds (possibility rates) that are set by the bookmaker, for example, are presented. By means of the odds information, the player can play the game (bookgame) of that event by operating the operating section, separately from the gaming machine-original game, in order to receive an award of the odds for that event. In other words, in addition to the gaming machine-original game, the player can play the bookgame of the popular event, so both games can be enjoyed.

Note that the gaming machine described above may be any machine which executes a game where a result can be seen in real time, such as a slot machine or poker, or a game where it takes a while until a result is obtained, such as a horse race game or bingo. Further, various matters, which are the so-called wagers determined by the bookmaker, can fall into the event information to be received; and it is not limited to specific information.

Moreover, in the above gaming machine, the bookgame control means may have the bet result outputting means for outputting information on bet results for the event to the player when accepting the bet on the event.

In such a configuration, in the stage where the gaming machine accepts the bet on that event, the bet result information is outputted to the player immediately, thus the player does not have to occupy the gaming machine until the event ends, whereby it is possible to improve the rotation rate of the game of the gaming machine. Note that the bet result outputting means may issue a ticket in the form of a sheet by means of the ticketing device, or may be constituted such that the bet result information is delivered to the mobile terminal (cellular phone or the like) owned by the player, via the communication means.

In addition, the above gaming machine comprises an image display device, and the bookgame control means displays, on the image display device, the event information and odds information received via the communication control means.

In such a configuration, the player can immediately understand the event and the odds information on it through the image display device, thus the player can bet readily. Note that the image display device here may be exclusively for bookgames, or may be the one that displays the gaming machine-original games (a display for a slot game, or a display for a bingo). In other words, the gaming machine may be constituted such that the both games can be played in one image display device.

In order to achieve the above objects, the game method according to the present invention comprises the steps of; providing, in the gaming machine, odds information set for various events that are the objects for prediction; accepting a bet on an event by means of the odds information provided by the odds information providing step; and outputting information on bet results when a bet is carried out by the bet accepting step.

In such a game method, the gaming machine-original game can be played in the individual gaming machine installed in the game arcade, such as a casino or bar. For the publicly highly popular event, when it is the objects for prediction by the bookmaker or the like, the bet ticket (bet information) can be purchased, so the player can enjoy different games on a single gaming machine.

Moreover, in the above game method, it is possible that the bet ticket required for carrying out the bet can be purchased with the gaming medium of the gaming machine.

In such a game method, the player can bet the payout acquired in the gaming machine directly on a bookgame, so the player can enjoy each game.

DESCRIPTION OF THE PREFERRED EMBODIMENTS

The embodiments of the present invention will be specifically explained below with reference to the attached figures.

Figure 1:
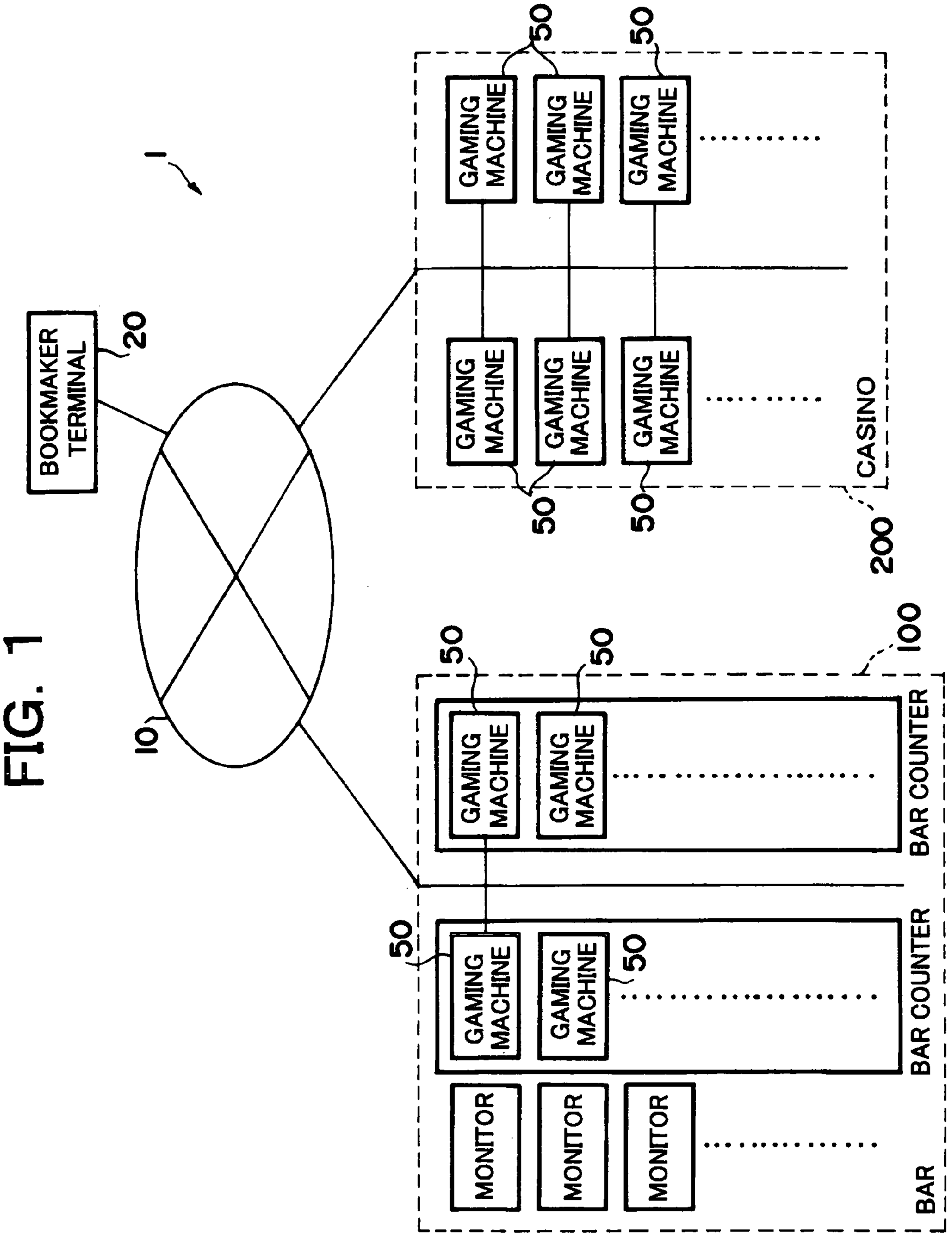
FIG. 1 is a block diagram showing the entire schematic configuration of the game system of the present invention.

FIG. 1 is a block diagram showing the entire schematic configuration of the game system of the present invention.

The game system 1 comprises a terminal 20 which determines odds for every event when the various events that are the objects for prediction are held, and which can distribute the determined odds through communication means 10 (a terminal which consists the odds setting means which sets odds, and this terminal is called a "bookmaker terminal"), and various gaming machines 50 which are connected to the communication means 10 and are installed in a place (game arcade), such as a bar 100 or casino 200, where various games can be played.

Here, the gaming machine 50 may be either a gaming machine where a result can be seen in real time, such as a slot machine or poker, (a single gaming machine), or a gaming machine which takes a predetermined amount of time until a result is obtained, such as a horse race game or bingo (a mass gaming machine). Moreover, each gaming machine 50 may be connected directly to the communication means 10, or may be connected to a management server (not shown) through a local area network (LAN) installed inside the game arcade, to be connected to the communication means 10 via this management server. Alternatively, a plurality of LANs may be constructed for every gaming machine, so the gaming machine 50 may be connected to the communication means 10 via the gateway connecting the respective LANs to each other. Further, the bar 100 and casino 200 shown in FIG. 1 may be interconnected via the LAN, when being implemented by the same administration entity.

The communication means 10 may be able to send and receive the information between the bookmaker terminal 20 and the gaming machines 50 that are connected to the communication means 10 by means of a wire/wireless communication, a private line, or a switched line, and, like the internet, the communication means 10 may be realized by combining a plurality of networks via the gateway.

Figure 2:
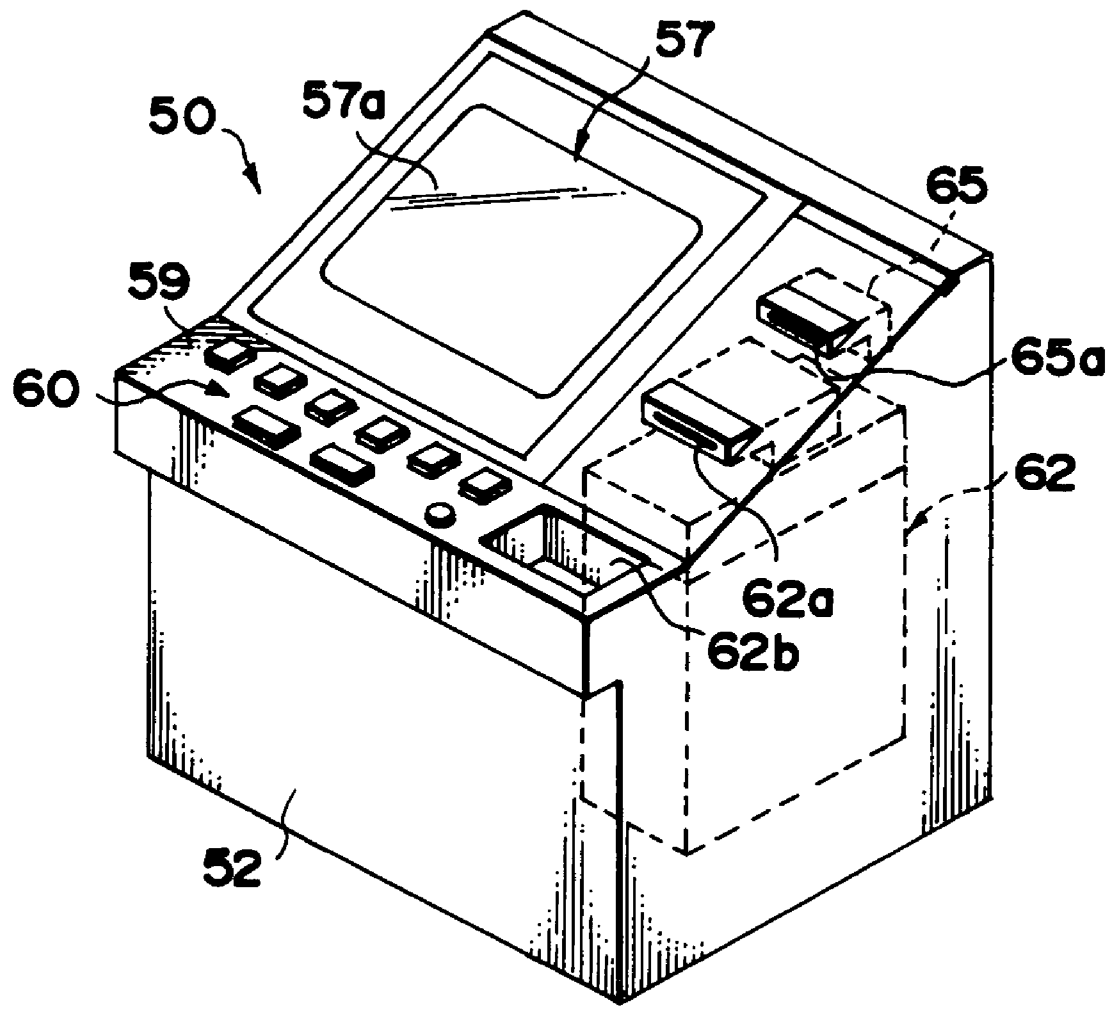
FIG. 2 is a perspective view showing an example of a gaming machine.
Figure 3:
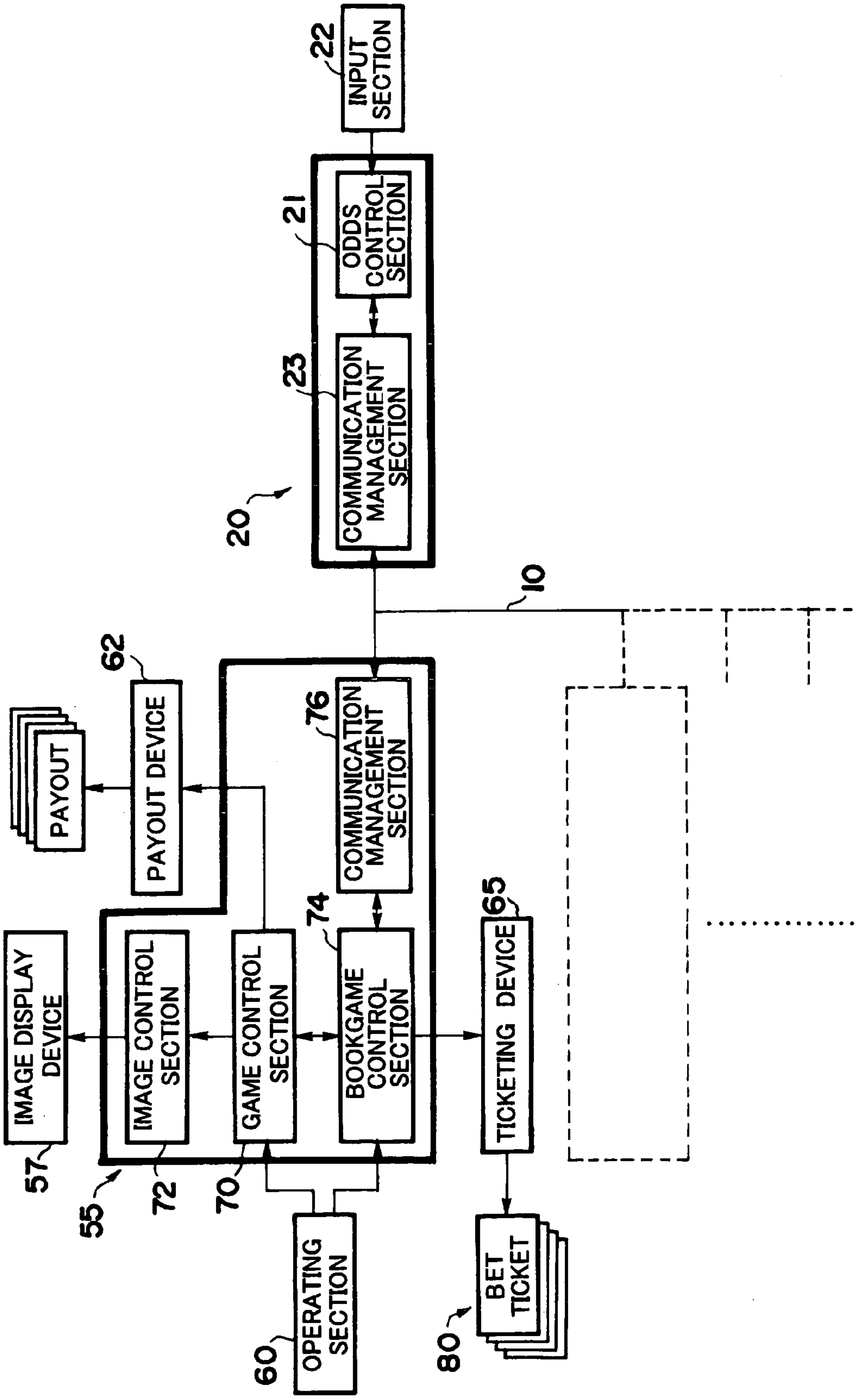
FIG. 3 is a block diagram showing the schematic configurations of a bookmaker terminal connected to the communication means, and of a gaming device in the gaming machine.

FIG. 2 is an appearance diagram showing an example of the gaming machine (card game machine). FIG. 3 is a block diagram showing the schematic configurations of the bookmaker terminal 20 connected to the abovementioned communication means 10, and of the gaming device in the card game machine 50 shown in FIG. 2.

Normally, an administration company called "bookmaker" takes popular events (events here include ranging from those where a winner is determined in a relatively short amount of time, such as baseball, football, and boxing, to those where a winner is determined in a relatively long period of time, such as determining who the next president will be, and so on) as wagers, determines the original odds, and sells the bet tickets. Regarding such popular events, the odds information determined for each event is delivered from the bookmaker terminal 20 to the gaming machines 50 installed in various game arcades, via the communication means 10.

The bookmaker terminal 20 is connected to the communication means 10, may be one of the various terminals (personal computer or the like), can deliver the odds information, and comprises: an odds control section 21 which is constituted by a central processing unit (CPU), rewritable memory (RAM), read-only memory (ROM) in which a predetermined sequence program and the like are stored, input-output device (I/O port) and the like; an input section 22 for inputting, from outside, the event information which is the object for prediction, the odds information corresponding to each event information item, and the like; and a communication management section 23 which is connected to the communication means 10, etc.

Note that in the method for determining odds that are set for above each event, there is a method which divides the amount of money obtained by subtracting the winning (house gain) from the profit obtained from the installment (the pari-mutuel method), and a method where an expert sets odds on the basis of the experience and the like (the bookmaker's method); however, either method may be used to set odds in the present invention. In this case, with the former odds determination method, in the odds control section 21 of the bookmaker terminal 20, a two-way communication among all the gaming machines is performed, and then arithmetic processing is performed on the basis of the information on the amount of money which was bet on the gaming machine side and of a predetermined computation program, whereby the updated information on the odds is delivered to all the gaming machines as needed. Furthermore, with the latter odds determination method, the arithmetic processing as described above is not performed by the odds control section 21, but the odds may be changed by the judgment of the expert. In this case, the information on the change of the odds is delivered to all the gaming machines (in this method, the player can keep the odds that the player has purchased, even if the odds are changed).

The gaming machine 50, which is a card game machine, comprises a housing 52 which is constituted such that a player can sit and play a game. There is provided a gaming device 55 for playing a card game in the internal space inside the housing. This gaming device 55 comprises an image display device 57 which is inclined such that the rear side of the gaming device 55 is raised with respect to the horizontal direction. A card game, such as poker, is played through a display section 57*a* of the image display device 57, and a bookgame, which will be described hereinafter, is played by operating a switch button to switch the screen. Specifically, the player can select either a display of a card game or a display of the information used in a bookgame (event information, odds information, etc.) by operating the switch button. Moreover, the housing 52 comprises a base portion 59 below the image display device 57, and this base portion 59 is provided with various operating sections (a BET button, cursor moving button, payout button, image switch button, etc.) 60 that are required when playing a game. Further, an accept/payout device 62 for accepting and paying out a gaming medium, such as a coin, is installed in a side portion of the housing 52, and, in an upper part thereof, a ticketing device 65 for issuing a bet ticket purchased in a bookgame is installed.

The abovementioned gaming device 55 comprises: a game control section (game control means) 70, which comprises: a CPU, program ROM, control RAM and the like for performing control operation in accordance with a preset program in order to control game processing operation in a card game and acceptance/payout of a gaming medium involved in the game; and an image control section 72 for controlling an image displayed on the display section 57*a* of the image display device 57, on the basis of a command sent from this game control section 70. Further, the gaming device 55 comprises a bookgame control section (bookgame control means) 74, which comprises a CPU, program ROM, control RAM and the like for performing control operation in accordance with a preset program in order to control game processing operation of the game (bookgame) where a bet is carried out based on the odds information that has been set according to the event.

Odds information for each event, which is delivered from the bookmaker terminal 20 via a communication management section 76, is inputted periodically, and this event information and odds information are displayed on the image display device 57 in the predetermined form via the game control section 70 and image control section 72. Moreover, the bookgame control section 74 accepts a bet through an operation of the operating section 60 for the event which is an object for the game, when the screen is switched from the card game to a bookgame. In this case, for the accepted bet, the bookgame control section 74 drives the ticketing device (ticketing means) 65 to issue the bet ticket having the predetermined form. Note that this bet information is sent to the bookmaker terminal 20 via the communication management section 76 and communication means 10, in the case of the pari-mutuel method, while the odds information is updated as needed and sent to the bookgame control section 74.

Also, in the present embodiment, the card game and bookgame can be played by inserting the same gaming medium. The bookgame control section 74 receives, from the gaming control section 70 side, information on the accumulated gaming medium gained in the card game, and performs control so that a bet in a bookgame can be made based on the received information. Specifically, the gaming medium paid out in the game of the gaming device is managed as a credit in the gaming control section 70 (recorded in the control RAM or the like), while the bookgame control section 74 performs, when it receives a request for a bet from the operating section 60, processing operation of the bet by using the credit managed in the game control section 70. Or, the gaming medium gained by the bet in the event may be managed as a credit in the bookgame control section 74 (recorded in the control RAM or the like), and when the game is switched to the card game again, the game control section 70 receives a request for a bet from the operating section 60, and thereafter performs processing operation of the card game by using the credit managed in the bookgame control section 74.

Next, the game execution procedures where a player actually plays a game in the game system described above will be explained hereinafter.

When the player plays a card game on the gaming machine 50, the player uses the switch button to have a card game screen displayed, and operates the screen of the image display device 57 and the gaming button of the operating section 60.

Figure 4:
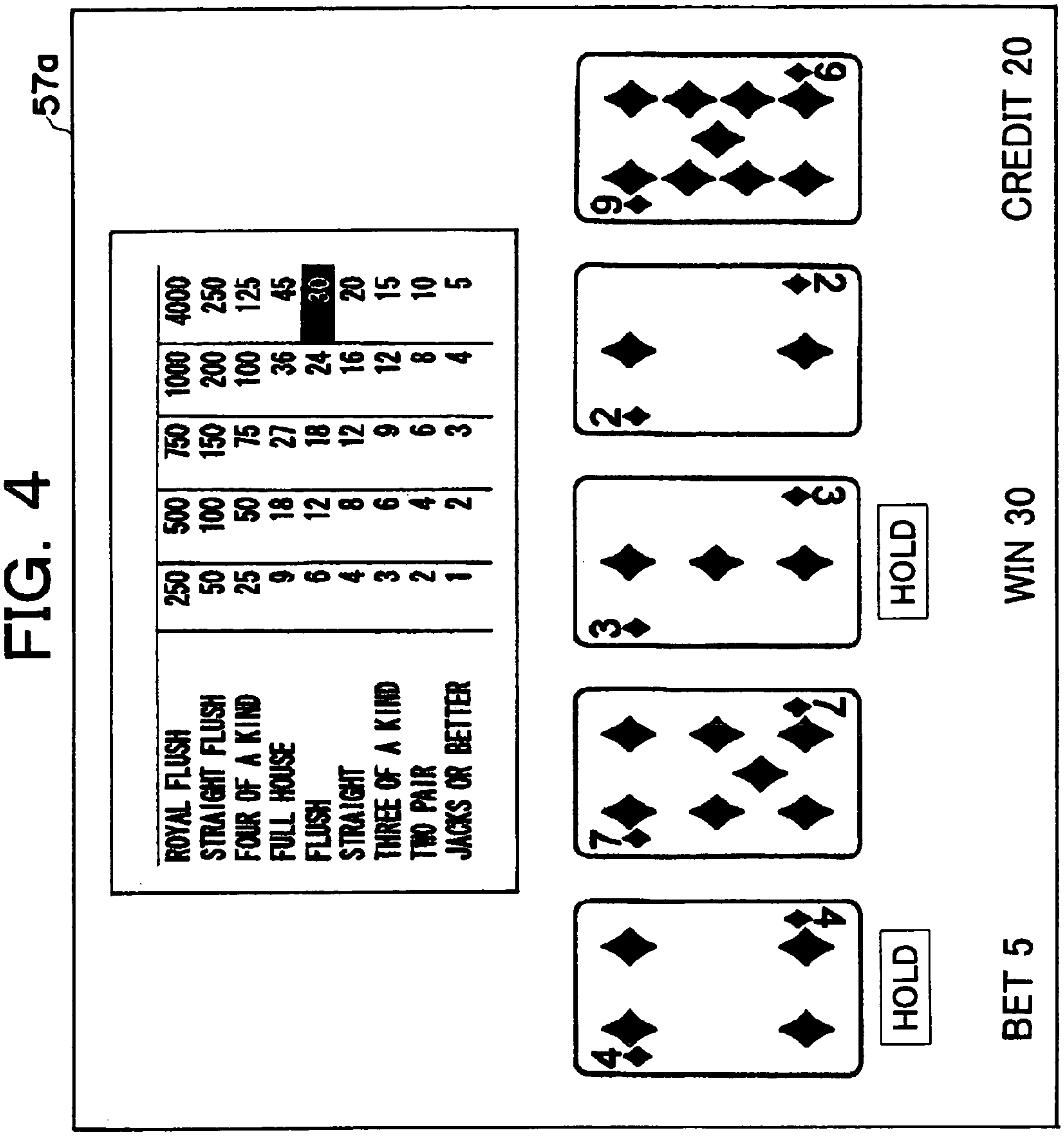
FIG. 4 is a view showing an example of an image display in a card game.
Figure 5:
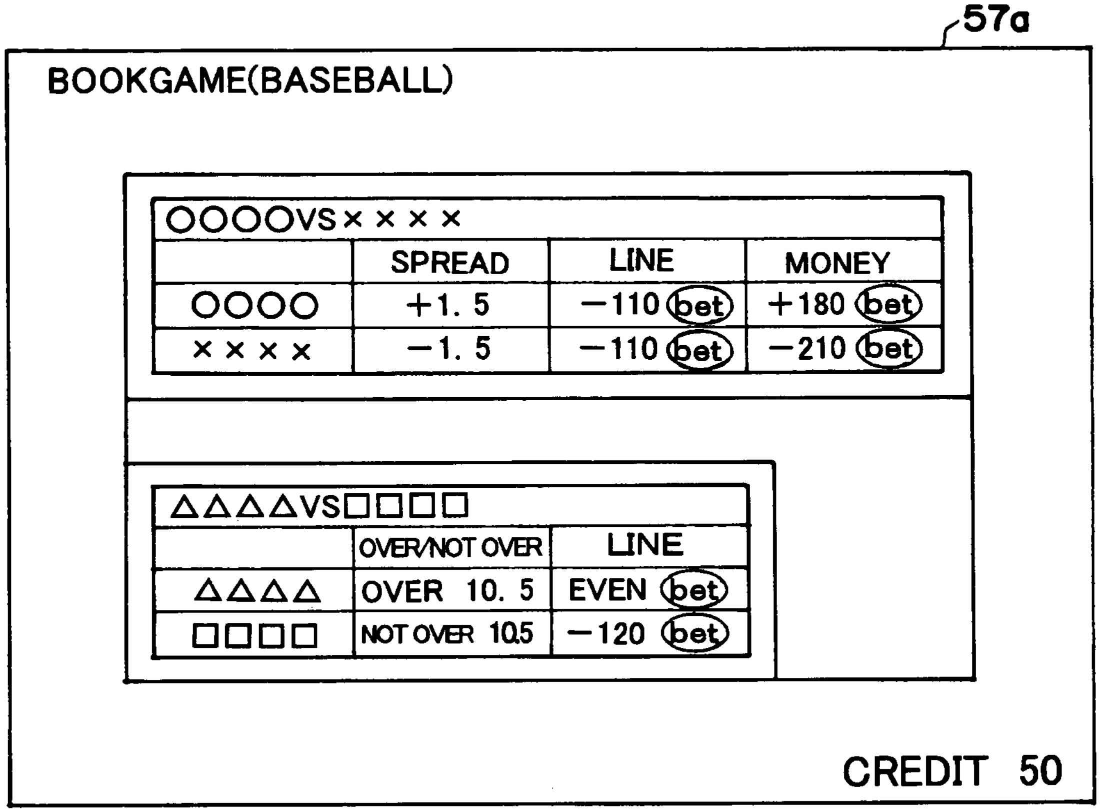
FIG. 5 is a view showing an example of an image display in a bookgame.

FIG. 4 shows an example where the card game is being played, in which the player at this point has gotten a flush and gained 30 points (the points will be increased to 50 points when added up with the credit that has been accumulated thus far). Then, through an operation of the image switch button located in the operating section 60, which is performed by the player during this game, the game control section 70 which received an instruction for switching the games outputs the instruction for switching the content displayed on the image display device 57 to the image control section 72, whereby the image of the card game shown at that time is switched to an image of the bookgame, as displayed in FIG. 5, for example. As shown in FIG. 5, the image of the bookgame is designed to display an event, which is the wager, inputted on the bookmaker terminal 20 side (baseball is the object), as well as the odds information on that event, and the player plays the bookgame by operating the cursor moving button and BET button in the operating section 60 while viewing the odds information. In this case, it is possible to bet through the bookgame by using the credit (50 points in this case) directly, which was gained in the card game which had been played thus far.

Figure 6:
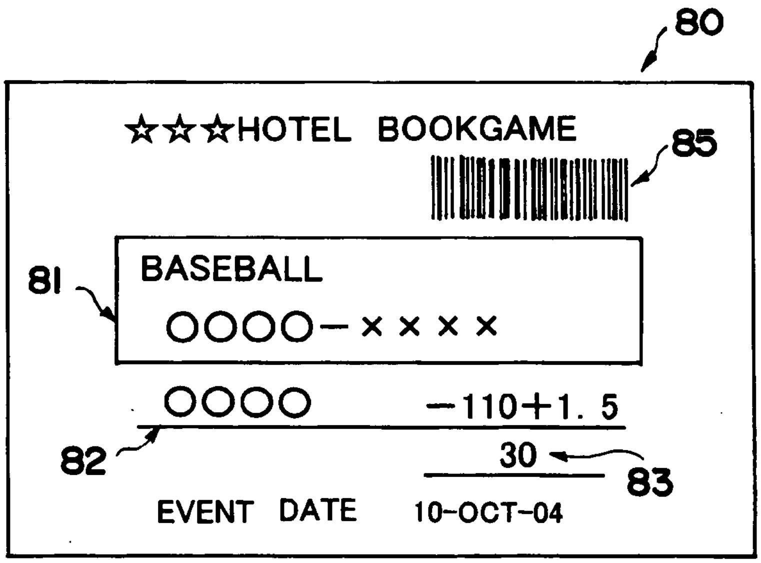
FIG. 6 is a view showing an example of a bet ticket.

When playing this bookgame, the player either inserts the gaming medium into a gaming medium insertion slot 62*a* of the accept/payout device 62 used in the card game as well (in the figure, it is designed to insert a bill, but it may be designed to insert a medal or coin), or alternatively uses the accumulated gaming medium gained in the card game, whereby a bet is completed. By operating the ticketing button in the operating section 60 as soon as the bet is finished, a bet ticket 80 as shown in FIG. 6 is discharged from a discharge opening 65*a* of the ticketing device 65. The bet ticket 80 shown in FIG. 6 shows an example of the bet ticket with which a bet is carried out in accordance with the display of the bookgame of FIG. 5. Object event information 81, odds information corresponding to a betted team 82, and bet information 83, for example, are printed on the bet ticket 80. Further, it is preferred that a security code (a bar code 85 as shown in the figure), which is managed by the management server of the entire gaming machine, be printed, so that when paying out, the normality of the bet ticket can be checked.

As described above, by installing the ticketing device 65 in the gaming machine, the player does not occupy the gaming machine until the event ends, for example, whereby it is possible to improve the efficiency of the rotation of players. Note that the gaming medium gained in the abovementioned card game or bookgame is to be paid out from a payout opening 62*b* of the accept/payout device 62.

Again, when the player plays a card game, the image of the bookgame is switched to an image of the card game by operating the image switch button, so the player can continue the card game that he/she was playing before. Note that, for example, the player can play the card game while enjoying the betted event relayed on the monitor or the like installed in the game arcade. Of course, as described above, the player can also use the payout obtained in the bookgame, directly in the card game.

According to the configuration described above, when a publicly highly popular event is held, and when it is the wager, odds (possibility rate) information set by the bookmaker, for example, is delivered to the various gaming machines 50 installed in a casino, bar or the like, and the player can join the bookgame in addition to the game that the player has been playing. In other words, since the player can purchase the bet ticket while viewing the odds information on the popular event on the gaming machine, the player can enjoy the game of the gaming machine, as well as the game of the event, thus it is possible to keep the attention of the player in the game arcade to the gaming machine with the event. The player can enjoy each game, since the player can bet on both games by using the same gaming medium.

The embodiments of the present invention have been explained; however the present invention is not limited to the abovedescribed embodiments and can also be implemented as will be described below, for example.

The image display device, which displays the event information and odds information, may be disposed in a different place separately from where the gaming machines are. Also, when providing the image display device in the gaming machine, the image display device for playing a gaming machine-original game and the image display device for playing a bookgame may be installed separately, and further, the image display device for playing a bookgame may be configured such that an event of the wager is relayed. Moreover, regarding the abovementioned gaming medium, the design may be such that different types of gaming medium are accepted in the game of the gaming machine and the bookgame, respectively. The operating section may also be designed to be disposed in a different location independently, other than being disposed on the same base.

The game control section of the gaming device installed in the abovementioned gaming machine, as well as the bookgame control section may be mounted on the same base plate, and the functions thereof may be processed by means of a single CPU, ROM, RAM or the like. Moreover, the bookgame control section and communication management section may be configured such that they are taken, in advance, as a separate unit (bookgame unit), which is then incorporated in the various gaming machines accordingly.

Furthermore, the configuration may be such that the ticketing device, which is the ticketing means, is not incorporated in the gaming machine. The awards obtained from the bookgame may be paid out by means of a payout-only device installed separately, other than being paid out by means of the accept/payout device installed in each gaming machine. Moreover, the outputting means, which outputs the information on bet results, may be configured so as to deliver the information in the prescribed form to a device that prints the information on a sheet of a tangible entity and outputs it, as described above, or to the portable terminal of the player.

In addition, the present invention explains the gaming machine installed in the casino or bar or the like as an example, the gaming machine with the abovedescribed configuration may be installed in a place where bookgames are mainly played (sports book, etc. in a hotel). In such a configuration, the game of the gaming machine can be enjoyed between the events, and when no event is held, the place can be operated as a casino having mainly gaming machines.

As described above, according to the configuration of the present invention, in the game arcade such as a casino, bar, or the like, even when a publicly highly popular event is relayed, a player there can purchase the bet ticket from the gaming machine on which the game is played on the basis of the odds that are set for the event, thus it is possible to keep the attention of the player to the game of the gaming machine. Moreover, the player can enjoy a plurality of games at the same time.

What is claimed is:

1. A game system, comprising:

a plurality of monitors installed in a plurality of gaming facilities for relaying a variety of events;

a plurality of gaming machines installed in the gaming facilities;

a bookmaker terminal for generating odds information associated with the variety of events, the bookmaker terminal including:

an odds control section having a CPU to perform arithmetic processing based on an amount-of-money information, the amount-of-money being of a predetermined computation program and bet on one of the gaming machines, the odds control section distributing an updated odds information to all of the gaming machines; and a communication means for distributing the odds information from the bookmaker terminal to the gaming machines, each of the gaming machines comprising:

an operating section including a change button for switching between a screen of a bookgame and a screen of a game played at the gaming machine;

a game control section with a CPU for performing control operation in accordance with a preset program to control acceptance or payout of gaming media associated with a game processing operation of the game based on an operation of the operating section;

a bookgame control section for receiving the odds information from the bookmaker terminal and for accepting a bet by the operation of the operating section;

a ticketing device controlled by the bookgame control section to drive and issue the bet placed by the operation of the operating section;

an image display device operated by the operating section for interchangeably displaying on the image display device (i) the screen of the bookgame with the odds information associated with the variety of events and (ii) the screen of the game; and an image control section for controlling an image to be displayed on the image display device based on a command from the game control section.

2. The game system according to claim 1, wherein in said bookgame control section, a gaming medium accepted by a gaming device is useable for the bet on the event.

3. The game system according to claim 2, wherein said gaming medium is credited, and the credited gaming medium is usable for at least one of said gaming device and said bookgame control section.

4. The game system according to claim 1, wherein said bookgame control section has a bet result outputting section which outputs bet information for the bet on the event to a player that operates the game machine when accepting the bet.

5. The game system according to claim 1, wherein in said gaming machine, the game can be played on a gaming device by utilizing a paid out gaming medium by the bookgame control section, when the bet on the event is won.

6. The game system according to claim 5, wherein said gaming medium is credited, and the credited gaming medium is usable for at least one of said gaming device and said bookgame control section.

7. A gaming machine, comprising:

a gaming device which executes a game, an outcome of the game being predetermined by the gaming device;

a communication management section for receiving odds information associated with a variety of events from a bookmaker terminal via a communication means;

an operating section including a change button for switching between a screen of a bookgame and a screen of a game played at the gaming machine;

a game control section with a CPU for performing control operation in accordance with a preset program to control acceptance or payout of gaming media associated with a game processing operation of the game based on an operation of the operating section;

a bookgame control section for receiving the odds information from the bookmaker terminal via the communication management section and for accepting a bet by the operation of the operating section;

a ticketing device controlled by the bookgame control section to drive and issue the bet placed by the operation of the operating section;

an image display device operated by the operating section for interchangeably displaying on the image display device (i) the screen of the bookgame with the odds information and (ii) the screen of the game; and an image control section for controlling an image to be displayed on the image display device based on a command from the game control section.

8. The gaming machine according to claim 7, wherein said gaming media is credited, and the credited gaming media is usable for at least a gaming device and said bookgame control section.

9. The gaming machine according to claim 7, said bookgame control section has a bet outputting section which outputs bet information for the bet on the event to a player that operates the gaming machine when accepting the bet.

10. The gaming machine according to claim 7, further comprising an image display device, wherein said bookgame control section causes said image display device to display event information and said odds received by a communication control section.

11. The gaming machine according to claim 7, wherein said ticketing device is constituted so as to print a security code on said bet ticket.

12. The game system according to claim 1, wherein said game can be played and said bet on the event can be placed simultaneously.

13. A game method, comprising the steps of:

relaying a variety of events by a plurality of monitors installed in a plurality of gaming facilities;

generating odds information associated with the variety of events by a bookmaker terminal;

performing arithmetic processing based on an amount-of-money information by an odds control section having a CPU, the amount-of-money being of a predetermined computation program and bet on one of a plurality of gaming machines installed in the gaming facilities, distributing an updated odds information by the odds control section to all of the gaming machines;

distributing the odds information by a communication means from the bookmaker terminal to the gaming machines, switching by a change button of an operating section between a screen of a bookgame and a screen of a game played at the gaming machine;

performing control operation by a game control section with a CPU in accordance with a preset program to control acceptance or payout of gaming media associated with a game processing operation of the game based on an operation of the operating section;

receiving the odds information by a bookgame control section from the bookmaker terminal and accepting a bet by the operation of the operating section;

driving and issuing, by a ticketing device controlled by the bookgame control section, the bet placed by the operation of the operating section;

displaying interchangeably on an image display device operated by the operating section (i) the screen of the bookgame with the odds information associated with the variety of events and (ii) the screen of the game; and controlling an image to be displayed on the image display device by an image control section based on a command from the game control section.

14. The game method according to claim 13, wherein a bet ticket required for accepting said bet can be purchased with a gaming medium of said gaming machine.

15. The game method according to claim 13, wherein said game can be played and said bet on the event can be placed simultaneously.

16. A game system, comprising:

a plurality of monitors installed in a plurality of gaming facilities for relaying a variety of events;

a plurality of gaming machines installed in the gaming facilities;

a bookmaker terminal for generating odds information associated with the variety of events, the bookmaker terminal including:

an odds control section having a CPU to perform arithmetic processing based on an amount-of-money information, the amount-of-money being of a predetermined computation program and bet on one of the gaming machines, the odds control section distributing an updated odds information to all of the gaming machines; and a communication means for distributing the odds information from the bookmaker terminal to the gaming machines, each of the gaming machines comprising:

a change button for switching between a screen of a bookgame and a screen of a game played at the gaming machine;

a game control means with a CPU for performing control operation in accordance with a preset program to control acceptance or payout of gaming media associated with a game processing operation of the game;

a bookgame control means for receiving the odds information from the bookmaker terminal and for accepting a bet;

a ticketing device controlled by the bookgame control section to drive and issue the bet;

an image display device for interchangeably displaying on the image display device (i) the screen of the bookgame with the odds information associated with the variety of events and (ii) the screen of the game; and an image control section for controlling an image to be displayed on the image display device based on a command from the game control means.

17. A gaming machine, comprising:

a gaming device which executes a game, an outcome of the game being predetermined by the gaming device;

an operating means including a change button for switching between a screen of a bookgame and a screen of a game played at the gaming machine;

a game control means with a CPU for performing control operation in accordance with a preset program to control acceptance or payout of gaming media associated with a game processing operation of the game based on an operation of the operating means;

a bookgame control means for receiving odds information associated with a variety of events from a bookmaker terminal and for accepting a bet by an operation of the operating means:

a ticketing device controlled by the bookgame control means to drive and issue the bet placed by the operation of the operating means;

an image display device operated by the operating means for interchangeably displaying on the image display device (i) the screen of the bookgame with the odds information and (ii) the screen of the game; and an image control means for controlling an image to be displayed on the image display device based on a command from the game control means.

18. The game system according to claim 16, wherein said game can be played and said bet on the event can be placed simultaneously.

* * * * *